(12) United States Patent
Vallejo Veiga et al.

(10) Patent No.: US 9,523,609 B2
(45) Date of Patent: Dec. 20, 2016

(54) SPECTRAL IMAGING

(71) Applicant: BAE SYSTEMS plc, London (GB)

(72) Inventors: Ivan Vallejo Veiga, Briston (GB);
Leslie Charles Laycock,
Chelmsford-Essex (GB); Michael Stewart Griffith, Chelmsford-Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/783,616

(22) PCT Filed: Apr. 8, 2014

(86) PCT No.: PCT/GB2014/051087
§ 371 (c)(1),
(2) Date: Oct. 9, 2015

(87) PCT Pub. No.: WO2014/167308
PCT Pub. Date: Oct. 16, 2014

(65) Prior Publication Data
US 2016/0084708 A1    Mar. 24, 2016

(30) Foreign Application Priority Data

Apr. 10, 2013 (EP) .................................. 13275088
Apr. 10, 2013 (GB) ................................. 1306489.4

(51) Int. Cl.
*G01J 3/28*    (2006.01)
*G01J 3/02*    (2006.01)

(52) U.S. Cl.
CPC ............ *G01J 3/2823* (2013.01); *G01J 3/0208* (2013.01); *G01J 3/0237* (2013.01); *G01J 2003/2826* (2013.01)

(58) Field of Classification Search
CPC .............. G01J 3/02; G01J 3/28; G01J 3/2803; G01J 3/10; G01J 3/2823
(Continued)

(56) References Cited

U.S. PATENT DOCUMENTS 5,986,758 A    11/1999 Lyons et al.
6,295,118 B1    9/2001 Takeuchi
(Continued)

FOREIGN PATENT DOCUMENTS

WO    2011138606 A1    11/2011
WO    2014167308 A1    10/2014

OTHER PUBLICATIONS

International Preliminary Report on Patentability received for Patent Application No. PCT/GB2014/051087, mailed on Oct. 22, 2015. 8 pages.
(Continued)

*Primary Examiner* — Tarifur Chowdhury
*Assistant Examiner* — MD M Rahman
(74) *Attorney, Agent, or Firm* — Finch & Maloney PLLC

(57) ABSTRACT

There is disclosed a spectral imaging apparatus for processing electromagnetic (EM) radiation, the EM radiation originating from a target scene and comprising a wide range of frequencies, the system comprising:
A dispersive element for receiving EM radiation from the target scene and promoting differing amounts of dispersion depending on the frequency of the EM radiation,
A deformable lens arranged to receive EM radiation from the dispersive element,
An imaging sensor for detecting EM radiation across the wide range of frequencies, and arranged to receive EM radiation from the deformable lens,
Wherein the deformable lens is operable to adopt any one of a plurality of focal conditions, each focal condition tending (Continued)

to focus a different range of the EM radiation at the imaging sensor, each focal condition thereby defining a component band for the EM radiation.

18 Claims, 4 Drawing Sheets

(58) Field of Classification Search
USPC ........................................................ 356/326
See application file for complete search history.

(56) References Cited

U.S. PATENT DOCUMENTS

| | | | | |
|---|---|---|---|---|
| 7,072,086 | B2* | 7/2006 | Batchko | G02B 3/14 359/15 |
| 7,242,698 | B2* | 7/2007 | Schwarz | H01S 3/08059 372/20 |
| 8,687,165 | B2* | 4/2014 | Wang | G02F 1/29 349/193 |
| 2003/0058400 | A1* | 3/2003 | Zhuang | G02F 1/13342 349/196 |
| 2003/0086091 | A1 | 5/2003 | Hinnrichs et al. | |
| 2005/0259216 | A1* | 11/2005 | Lin | G02F 1/13342 349/196 |
| 2006/0263079 | A1* | 11/2006 | Koishi | G02F 1/13342 396/288 |

OTHER PUBLICATIONS

International Search Report and Written Opinion received for Patent Application No. PCT/GB2014/051087, mailed on May 15, 2014. 6 pages.
GB Intellectual Property Office Search Report under Section 17(5) received for GB Patent Application No. 1306489.4 mailed on May 21, 2013. 3 pages.
EP Intellectual Property Office Extended Search Report received for EP Patent Application No. 13275088.6 mailed on Jul. 29, 2013. 9 pages.
Arenberg, J., et al., "Architectures for Space Astronomical Telescopes Using Fresnel Optics," 2006 IEEE Aerospace Conference; Big Sky, Montana, Mar. 4-11, 2006. pp. 1-13.
Valley, P., et al., "Flat liquid crystal diffractive lenses with variable focus and magnification," SPIE, vol. 7786, Dec. 31, 2010. 12 pages.

* cited by examiner $I_g$ $I_{all}$

SPECTRAL IMAGING

According to the present invention there is provided a spectral imaging apparatus for processing electromagnetic (EM) radiation, the EM radiation originating from a target scene and comprising a wide range of frequencies.

In the fields of hyperspectral and multi-spectral imaging, hereinafter called "spectral imaging" for the sake of simplicity, separate images of an image scene are captured for a plurality of electromagnetic frequency bands or values. The different electromagnetic frequency bands or values are typically distributed over a plurality of regions of the electromagnetic spectrum, for example distributed over more than one of infra-red, visible light and ultraviolet. Conventional spectral imaging apparatus tends to be large and complex.

It is known from the applicant's earlier publication WO 2011/138606 to provide a spectral imaging system, comprising: a deformable lens comprising dispersive material; means for deforming the lens to vary the focal length of the deformable lens; and one or more processors arranged to discriminate between different frequencies of sensed electromagnetic radiation by virtue of differing focusing, arising from the dispersion of the deformable lens, of the respective different electromagnetic frequencies. The imaging system tends to further comprise a sensor arranged to provide a fixed image plane.

Such a spectral imaging system is suited to continuous operation as a spectral imaging apparatus.

According to the invention there is provided a spectral imaging apparatus for processing electromagnetic (EM) radiation, the EM radiation originating from a target scene and comprising a wide range of frequencies, the system comprising: a dispersive element for receiving EM radiation from the target scene and promoting differing amounts of dispersion depending on the frequency of the EM radiation, a deformable lens arranged to receive EM radiation from the dispersive element, an imaging sensor for detecting EM radiation across the wide range of frequencies, and arranged to receive EM radiation from the deformable lens, wherein the deformable lens is operable to effect any one of a plurality of focal conditions, each focal condition tending to focus a different range of the EM radiation at the imaging sensor, each focal condition thereby defining a component band for the EM radiation.

As such an imaging apparatus is provided which may, by varying the focal condition (e.g. the focal length) of the deformable lens, select or isolate specific component bands of the incoming EM radiation and use these alone or in combination with other specific component bands for further analysis.

Various options stem from such isolation of a particular component band. For example the selection of a relevant component band may allow for the detection of reflected illumination from a laser which works at a known wavelength, for instance where the operator may be using the laser to provide covert illumination of an otherwise dark scene (e.g. using a SWIR laser at night-time.

Further, such component band isolation may allow for passive (e.g. covert) detection of illumination and sources of illumination, with a specific wavelength, without revealing the location of the spectral imaging apparatus.

Also, the operator is provided with the option of looking for a particular substance or object which has a particularly strong contrast with "background" (everything else) in that particular waveband - for instance, an "identify friend or foe" (IFF) system, or a particular type of vegetation.

Further, the operator may restrict their attention to a particular band in which the atmosphere is opaque, such that it blocks ambient (solar) illumination, so that sources of illumination of interest to the operator are emphasised, while uninteresting "background clutter" is suppressed. In particular, the operator may restrict their attention to the UV "solar blind" waveband, which is commonly used for missile plume detection, or for detecting electrical faults in high-voltage infrastructure.

Still further, the component bands may be used to analyse the EM radiation for patterns characteristic of certain chemicals and as such determine whether such chemicals are present.

Also, so as to correct for any chromatic aberration which might arise at the imaging sensor, an image could be recorded by individually recording narrow bands of radiation, and then combining them later.

By providing a deformable lens, it becomes possible to vary the focal condition without varying the separation of the sensor and lens; the deformable lens and imaging sensor can be held at a fixed separation along the optical axis. Thus, the apparatus can tend to be more compact and robust, e.g. in comparison to systems where the lens moves along the optical axis relative to the imaging sensor.

As compared to the applicant's previous application, published as WO 2011/138606, where a fluidic lens was used as the dispersive element, the provision of a dispersive element separate and distinct from the fluidic lens can allow for the provision of a dispersive element which is more dispersive and where focal length is inversely proportional to wavelength.

The dispersive element may be a selectively dispersive element, having a dispersive condition and a non-dispersive condition and being operable to switch from one condition to the other.

As such the imaging sensor may detect either the full spectrum of the EM radiation to which the apparatus is sensitive, or specific component bands thereof.

Such an arrangement may be useful where the context-relevant component bands are narrow such that no band fully covers the visible spectrum but there is still facility in detecting the image as it may look to the human eye (e.g. so that the image may be relayed to a viewing screen).

The selectively dispersive element may comprise: a First Switchable lensing device (FSLD) which in a first state allows EM radiation to pass substantially unaffected and which in a second state collimates the received EM radiation, wherein the FSLD is arranged to receive light from the target scene; and a Second Switchable Lensing Device (SSLD) which in a first state disperses received EM radiation and in a second state allows EM radiation to pass substantially unaffected, the SSLD being arranged to receive light from the FSLD, wherein the FSLD and the SSLD may both be placed in their first states to effect the dispersive condition of the dispersive element, or may both be place in their second states to effect the non-dispersive condition of the dispersive element. The FSLD may be a fluidic lens.

The SLD may comprise: a diffractive element having a first refractive index and comprising surface relief elements; and a liquid crystal element, complimentary to the diffractive lens and operable in the first state of the SDL to have a refractive index different to the first refractive index and in the second state of the SDL to have a refractive index substantially matching the first refractive index.

The diffractive lens may be a blazed circular grating or a bragg programmable grating or a kinoform.

If comprising a selectively dispersive lens, the spectral imaging apparatus may further comprise a user-operated switch for changing the dispersive element between the dispersive condition and the non-dispersive condition.

Regardless of whether the dispersive element is selectively dispersive or not, the dispersive element may comprise a diffractive grating. In particular, the grating may be a blazed circular grating. Other grating type elements, such as kinoforms and bragg gratings may be employed as alternatives or in combination with the blazed grating.

In general the deformable lens is a fluidic lens. In particular, the fluidic lens may be substantially non-dispersive and comprise a non-dispersive fluid.

Such provisions tend to reduce the design-requirement for moving mechanical parts and as such can further promote a compact and lightweight form. Such a form can make the apparatus suitable for a variety of users and uses, for example, the apparatus may be handheld and the user-operated switch may be manually operable. Where the apparatus is handheld, the apparatus in a form that is easily transported by an operator and can be easily used without necessitating further mounting apparatus such as a tripod or vehicle or other platform (though such could be used if desirable).

The plurality of focal conditions may define at least a component band in the infra-red range, and/or at least a component band in the ultra-violet range, and/or at least a component band in a visible range.

As such, the apparatus can be set-up to interrogate a broad range of frequencies and thereby increase the options for searching for e.g. characteristic signatures of certain chemicals.

The spectral imaging apparatus may comprise a viewing screen for providing an operator with an image representing a target scene.

Whilst other view finder systems may be used, a viewing screen can promote a compact design and can offer greater flexibility in superimposing data recognisable to the user.

Further the viewing screen may be arranged to providing an operator with an image representing a target scene, wherein the viewing screen is operable to superimpose hyperspectral data onto the image.

Such features further provide a user-interface between the operator and the hyperspectral data. The hyperspectral data which may be superimposed may represent the areas in the image where a certain substance or illumination has been detected, and thus, by viewing the superimposed data, the location of the substance or illumination within the scene will become apparent to the operator.

The apparatus may further comprise: a data processing unit interfaced with the imaging sensor; an actuator for the deformable lens; and a controller interfaced with the imaging sensor and the actuator, whereby the controller may act in concert with the data processing unit to interrogate the EM radiation.

As such the apparatus can carry out on-board processing to determine the existence of certain characteristics (e.g. chemical signatures, particular illumination frequencies) in the target scene. This may accelerate the operator's response in the field, for example in comparison to instances where data is logged and processed later or remotely.

The spectral imaging apparatus may comprise a user-operated switch for changing the focal condition of the deformable lens. This permits users to switch between focal lengths and detect different component bands at a time of their choosing.

Alternatively or additionally apparatus may be provided with an automatic sequencing of focal conditions. Where a controller is provided, this automatic sequencing may be pre-programmed by the controller according to requirements.

Where a viewing screen or view finder is provided, a sufficiently trained operator may be able to switch between views and recognise characteristic patterns/signature without reference to artificial signature recognition data processing algorithms.

According to a second aspect of the invention there is provided an Unmanned Vehicle comprising the apparatus of the first aspect.

So that the invention may be well understood, at least one exemplary embodiment thereof shall now be described and with reference to the following figures of which:

Figure 1:
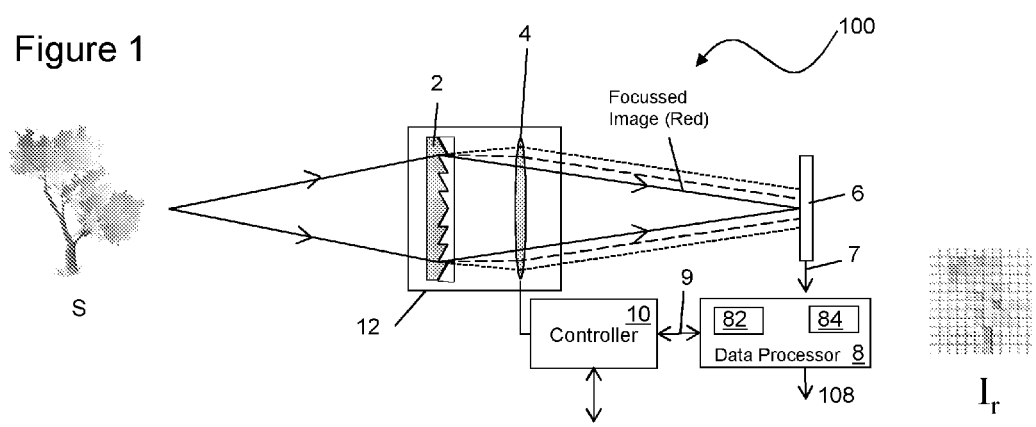
FIG. 1 shows schematically a first embodiment of an imaging apparatus focussing 'red' light.
Figure 2:
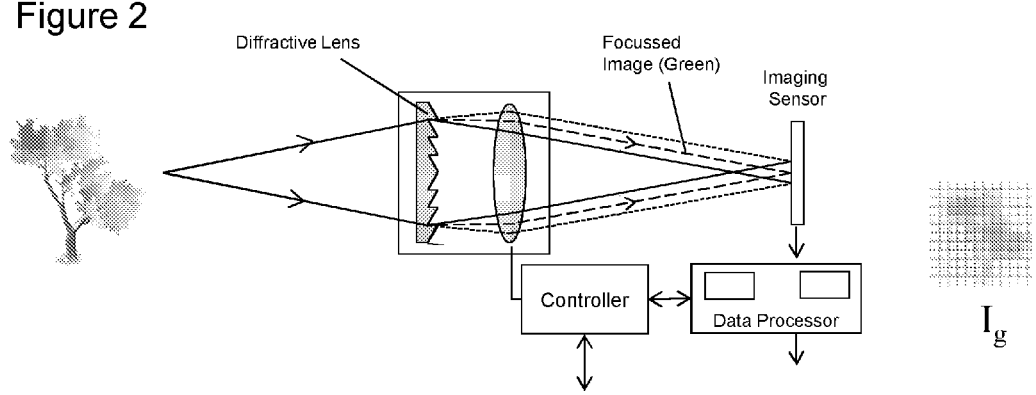
FIG. 2 shows schematically the apparatus of FIG. 1 focussing 'green' light.
Figure 3:
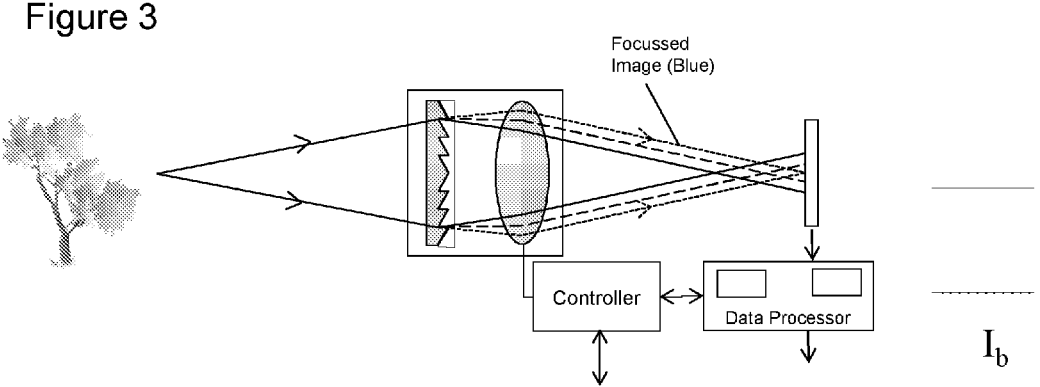
FIG. 3 shows schematically the apparatus of FIG. 1 focussing 'blue' light.

Referring to FIGS. 1, 2 and 3, a first embodiment of a spectral imaging apparatus 100 comprises a dispersive objective element 2 arranged to receive EM radiation (e.g. light), along an optical axis from a target scene S. The dispersive element 2 is operable to pass such received EM radiation to a deformable lens 4. The dispersive element 2 and deformable lens are mounted in a lens housing 12 such that the axis defined by each, is collinear with the optical axis.

In this embodiment, the dispersive element 2 is in the form of a blazed circular grating.

The deformable lens 4 is operable to transmit the EM radiation further along the optical axis and onto an imaging sensor 6, which is substantially perpendicular to the optical axis.

The imaging sensor 6 is operable to convert incident EM radiation into an electrical signal 7 representative of such radiation and output such electrical signal 7 to a Data Processor 8.

Accordingly the Data Processor 8 receives as an input the electrical signal 7. The data processor 8 is provided with a discriminator unit for isolating data corresponding to a particular frequency (e.g. the frequency corresponding to the focal length the deformable lens 4 is arranged to effect).

The data processor 8 is further operable to exchange signals 9 with a controller 10 and is provided with an input/output port 11 for interfacing with further components.

The controller 10 is operable to actuate the deformable lens 4 and as such is provided with an actuator (not shown) for effecting the deformation of the lens 4 in response to an electrical signal from the controller 10.

In the present embodiment, the deformable lens 4 is contemplated as a fluidic lens and the actuation mechanism contemplated is one of fluidic pressure.

Figure 4:
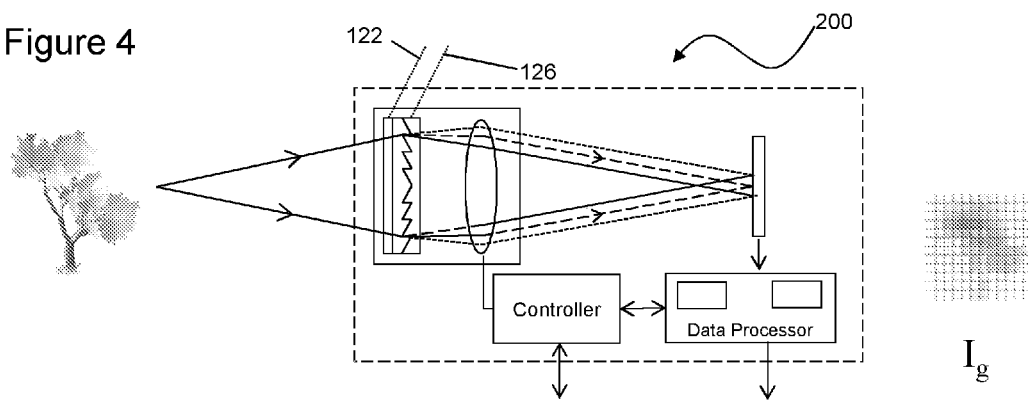
FIG. 4 shows schematically a second embodiment of an imaging apparatus operating in a first mode and focussing 'green' light.
Figure 5:
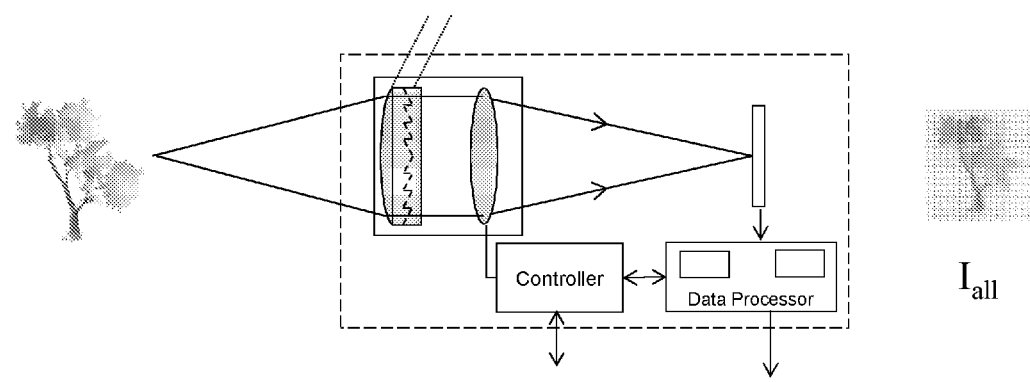
FIG. 5 shows schematically the second embodiment operating in a second mode to generally focus a broad range of frequencies.
Figure 7:
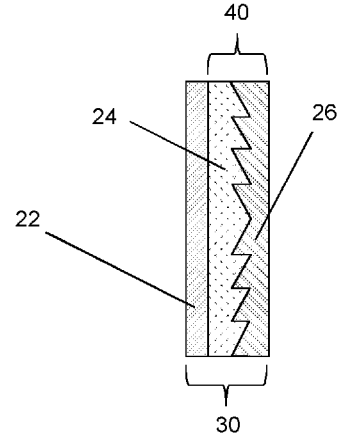
FIG. 7 shows a dispersive EM element for use in the second embodiment of the imaging apparatus.

Referring principally to FIGS. 4, 5 and 7, a second embodiment 200 of the imaging apparatus is shown.

The second embodiment 200 differs from the first 100 in having a selectively dispersive lens element 30 as a form of dispersive lens arranged to receive EM radiation from the target scene S.

Otherwise the second embodiment 200 is similar to the first 100 at least insofar as it comprises a deformable lens 4 for receiving EM radiation from the dispersive lens or equivalent, which tends to focus the EM radiation onto the imaging sensor 6. The imaging sensor 6 is connected to the Data Processor 8, which is in turn connected to a controller 10 for adapting the deformable lens 4 as duly required.

The selectively dispersive element 30 is comprised by an objective-disposed first switchable lensing device 22 arranged adjacent to a second switchable lensing device 40 such that EM radiation will tend to pass from the scene, through the first device 22 and then onto the second 40.

The first switchable lensing device 22 is a fluidic lens which can switch between a first state and a second state. Being a fluidic lens the first switchable lensing device comprises a reservoir of transparent fluid bounded between two flexible transparent lens walls. To effect the switch from the first state to the second and vice versa, the first device 22 is provided with a fluid input line 122.

In the first state, as shown in FIGS. 4 and 7, the device 22 is substantially laminar (i.e. the transparent walls of the lens which bound the fluid are substantially planar, parallel to one another, and perpendicular to the optical axis) and as such does not appreciably bend or otherwise manipulate the passing EM radiation.

In the second state, as shown in FIG. 5, the first switchable lensing device 22 presents a convex objective surface to the scene (e.g. by bowing the objective wall of the lens), whilst maintaining the back wall as planar (e.g. by constraining it, by way of a bonding, against a rigid member such as the second switchable lensing device 40), so as to substantially collimate the EM radiation incident along the objective axis.

The second switchable lensing device 40 comprises a diffractive grating lens 24 which presents a substantially flat surface on the objective side, and has an arrangement of raised surface relief elements on the other side. The diffractive grating lens 24 has a certain refractive index.

Further, the second switchable lensing device 40 comprises a liquid crystal cap 26, adjacent to the surface relief side of the grating lens 24. The cap 26 is arranged to interlock with the diffractive lens 24 at the interface therebetween and is flat on the opposite side.

As such, the diffractive grating 24 is arranged to receive EM radiation from the first switchable lensing device 22, and the liquid crystal cap 26 is arranged to receive EM radiation from the grating 24.

The liquid crystal cap 26 is connected to an electrical input line 126 and is configured such that a first electrical bias signal delivered along line 126 will provide the cap 26 with a first refractive index, and a second bias signal will provide the cap 26 with a second refractive index, different to the first but substantially similar to the refractive index of the diffractive lens 24.

Thus the second switchable lensing device 40 may switch back and forth between a first and a second state.

In the first state, as shown in FIG. 4, the liquid crystal cap 26 is biased with the first signal and as such the second device 40 tends to disperse the incident radiation.

In the second state, as shown in FIG. 5, the liquid crystal cap 26 is biased with the second signal and as such the effect of the surface relief elements of the diffractive lens 24 is nullified by the matching refractive index of the liquid crystal cap 26. Consequently, in the second state, the EM radiation passes through the device 40 without appreciable manipulation.

The combined effect of the various states of the first switchable lensing device 22 and the second switchable lensing device 40 is that the selectively dispersive element 30 may take on any one of a number of conditions.

Notably, in a dispersive condition, where the first switchable lensing element 22 is in its first (laminar) state and the second switchable lensing element 40 is in its first (different refractive index) state, the selectively dispersive element 30 functions in an equivalent manner to the dispersive element 2 of the first embodiment.

Further, in a non-dispersive (or passive) condition, where the first switchable lensing element 22 is in its second (collimating) state and the second switchable lensing element 40 is in its second (matched refractive index) state, the selectively dispersive element 30 tends to collimate the range of EM radiation from the target scene S at the relevant stand-off.

Figure 6:
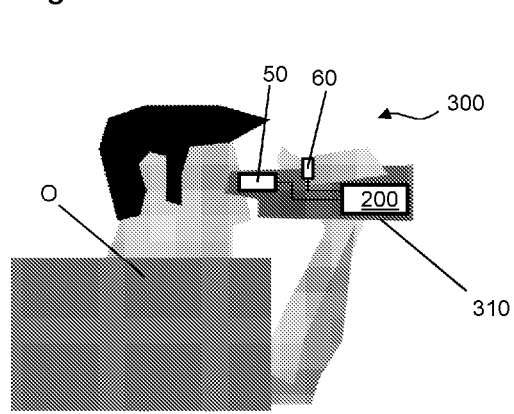
FIG. 6 shows the second embodiment of imaging apparatus arranged in a handheld device.

Referring to FIG. 6, there is shown a manually operable and portable camera apparatus 300 comprising the imaging apparatus 200 of the second embodiment.

The camera 300 further comprises a viewing screen 50 operably connected to the imaging apparatus 200 and a manual control 60 operably connected to the imaging apparatus 200. A housing 310 encases or at least offers a mounting for the camera 300 components.

The viewing screen receives the feed 108 output from the data processor 8. The manual control 60 provides or controls the input 122 to the first switchable lensing device 22 and the input 126 to the liquid crystal cap, and thereby enables the operator O to select whether the imaging apparatus 200 operates in a comprehensive-spectrum or component-by-component mode.

Still further there may be modes of operation of the camera 300, preprogramed into a memory (not shown) in the camera 300, which modes the operator O may toggle between using the manual controls 60. Such modes may comprise Monochrome Intensity (i.e. where the selectively dispersive element 30 is in a collimating/non-dispersive condition and the full visible spectrum is in focus at the imaging sensor 6, such comprehensive detection across all frequencies providing a greyscale image), and Hyperspectral (where the selectively dispersive element 30 is in its dispersive condition and the deformable lens 4 cycles through focal lengths in sync with the data processor discriminator).

The first embodiment 100 may be equivalently provided in a camera unit with a viewing screen and manual controls.

Figure 8:
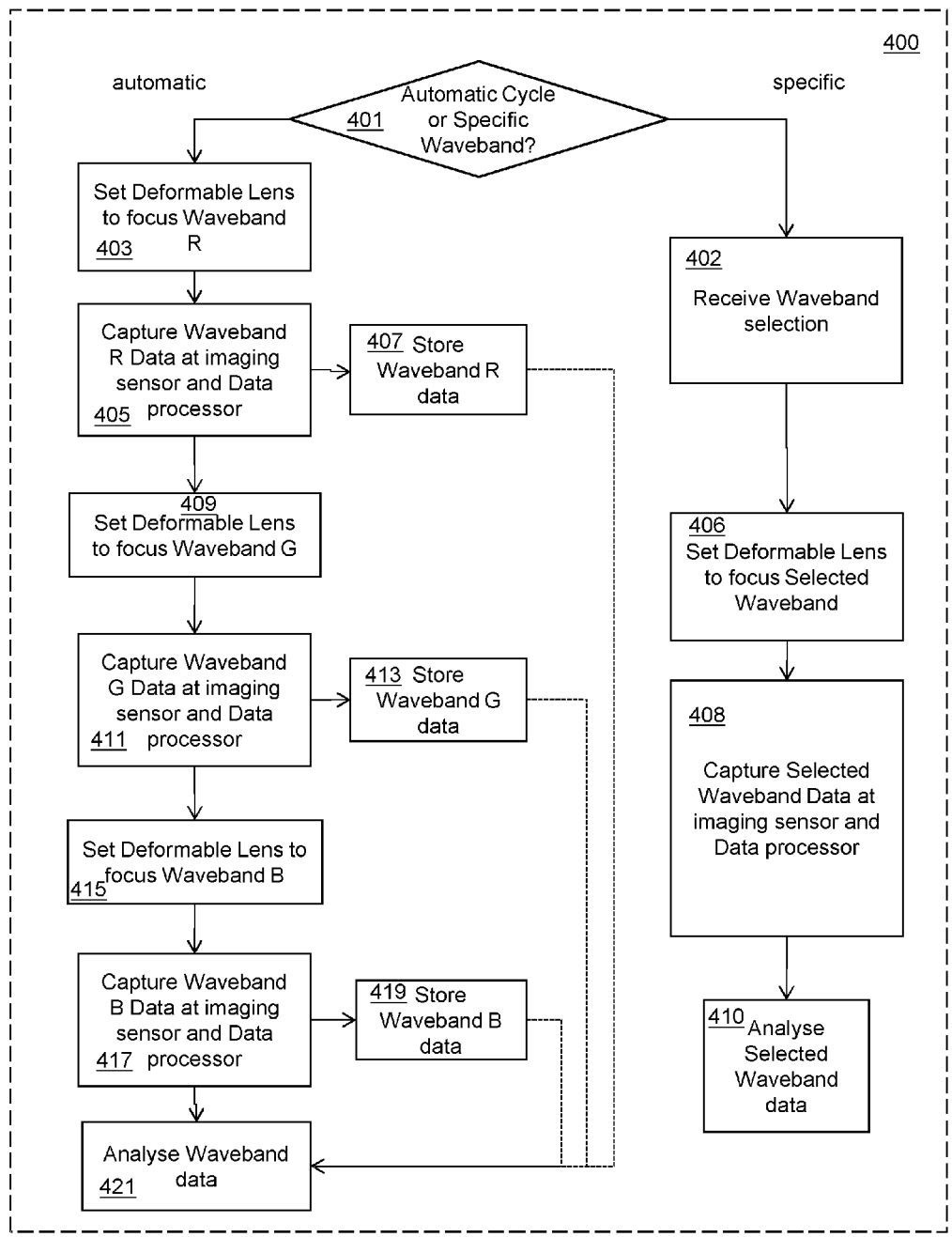
FIG. 8 shows a flow diagram outlining a mode of operation of the first embodiment of the invention.

Referring also to FIG. 8, the first embodiment 100 of the imaging apparatus may operate 400 in at least two different modes. In the first mode, the operator may specify a particular component band of incident EM radiation from which to collect data. In the second mode, the apparatus automatically cycles through a predetermined selection of component bands from which to collect data in a 'slice-by-slice' manner.

If the operator decides, at step 401, to analyse the EM radiation according to the automatic cycle, the apparatus can be instructed to execute the first mode of operation.

Initially in the first mode, the apparatus 100 will at step 403 (and as shown in FIG. 1) employ the controller 10 to arrange the deformable lens 4 to focus EM radiation in the R (e.g. red light) waveband onto the image sensor 6. Consequently, at step 405 the imaging sensor 6 is interrogated and the data processed with recourse to the discriminator 82 such that the R waveband data is captured (and other waveband data substantially discarded) and can, at step 407 be read into a memory 84 associated with the data processor 8. Other relevant data, such as the degree of dispersion of the waveband (which may assist with image recovery), may also be recorded in the memory 84 at this point. An image representing the R waveband data captured from scene S is shown labelled $I_r$.

Upon completion of step 405 the apparatus 100 automatically proceeds such that the controller 10, imaging sensor 6, memory 84 and data processor 8 may be equivalently employed in order to capture the G (e.g. green light) Waveband data in steps 409 (deformable lens arranging), 411 (data capturing), and 413 (data recording). FIG. 2 represents the state of the apparatus 100 for G waveband data capture. An image representing the G waveband data captured from scene S is shown labelled $I_g$.

Upon completion of step 411 the apparatus 100 automatically proceeds such that the controller 10, imaging sensor 6, memory 84 and data processor 8 may be equivalently employed in order to capture the B (e.g. blue light) Waveband data in steps 415 (deformable lens arranging), 417 (data capturing), and 419 (data recording). FIG. 3 represents the state of the apparatus for B waveband data capture. An image representing the B waveband data captured from scene S is shown labelled $I_b$.

With the R, G, and B data collected, analysis of the scene or display of the representative images may be undertaken at the data processor 8.

In particular, such analysis could seek to, for each component image, distinguish focused content from unfocussed content and thereby recover a focussed spectral image (i.e. a sequence of sharp images for component bands within the overall frequency range). Such an approach may obviate spectral filtering on the sensor. The process of stepping through these different component wavebands can be completed quickly so as to minimise the opportunity for the target scene S to change (for example because of relative movement between content in the scene and the imaging apparatus 100).

If the apparatus 100 operates to capture waveband data for a specific waveband only, then the process involves, at initial step 402, receiving instructions at the controller 10 relating to what the particular waveband of interest is, subsequently at step 406 appropriately arranging the deformable lens 4, and then at step 408 employing the imaging sensor 6 and the data processor 8 (including the discriminator 82) to capture the data for that waveband. Subsequently, the data can be analysed or displayed (e.g. at a viewing screen equivalent to viewing screen 50) at step 410.

In this mode, for illustrative purposes, the three wavebands have been denoted as R, G, and B, and correspond to the red, green and blue components of visible light. Other modes contemplated provide for two, four, five or any number of component wavebands to be stepped through (automatically or not) or selected from. Component wavebands may cover any section of the EM radiation spectrum including, or not, the visible spectrum. In particular, the overall selection of component bands may cover the UV, the visible and the IR ranges.

Figure 9:
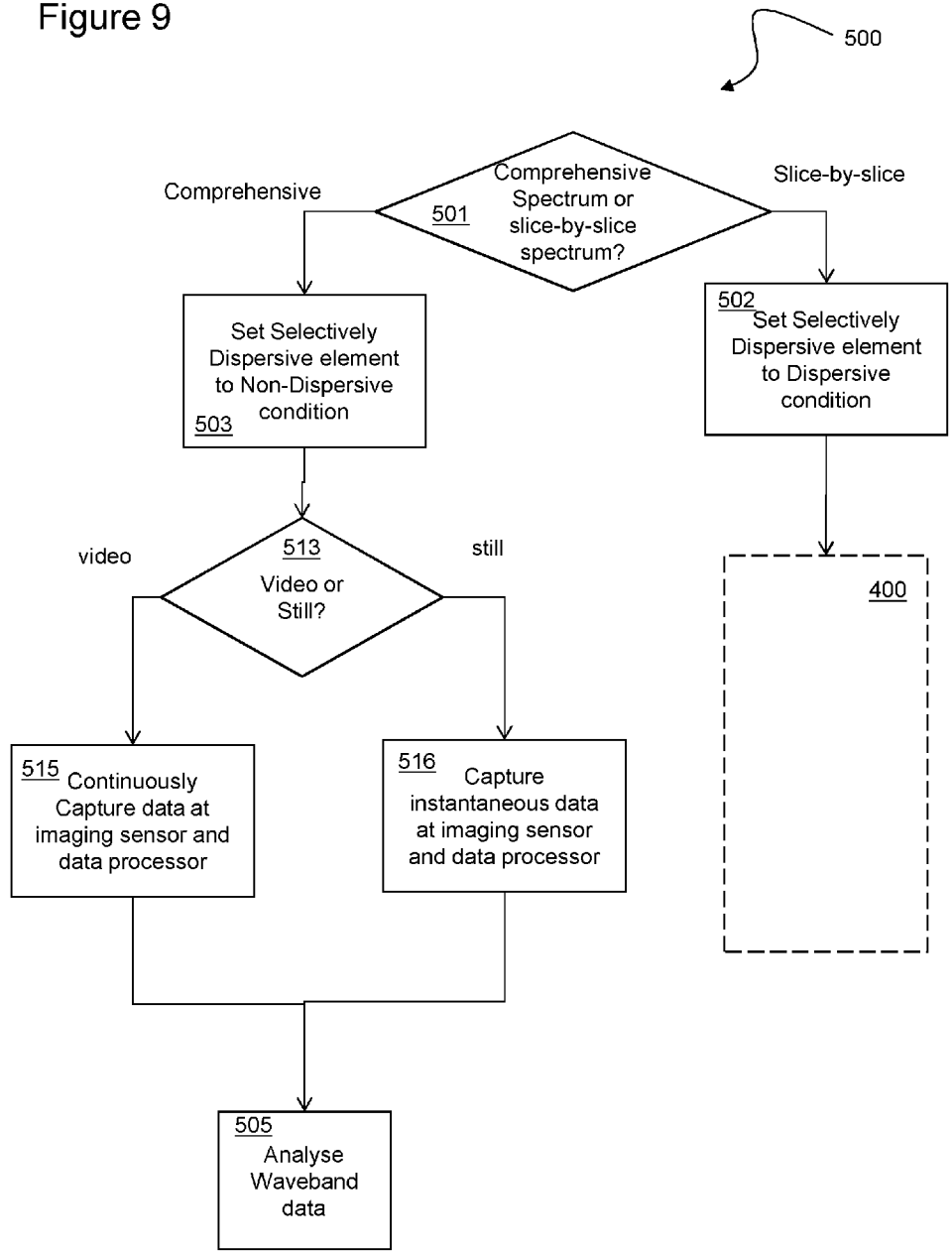
FIG. 9 shows a flow diagram outlining a mode of operation of the second embodiment of the invention.

Referring to FIG. 9, the overall operation 500 of the second embodiment 200 involves an initial decision 501 as to whether the apparatus 200 is to process the EM radiation from the scene S in a 'slice-by-slice' manner or in an 'comprehensive spectrum' manner. If the apparatus 200 is provided in a handheld camera (e.g. camera 300), such a decision could be made by an operator O and input via the manual controls (e.g. manual controls 60).

If it is decided to operate in a slice-by-slice manner, then the next step 502 is to set the selectively dispersive element 30 to a dispersive condition, and then operate as per process 400 as described above and set out in FIG. 8.

If it is decided to perform comprehensive-spectrum processing of the EM radiation from the scene S the initial step 503 is to set the selectively dispersive element 30 to a collimating/non-dispersive condition. At completion of step 513, the apparatus will tend to resemble the arrangement shown in FIG. 5, with a greyscale image representing the scene shown at $I_{all}$.

Subsequently a decision 513 can be made as to whether to process a still image or a video representing the EM radiation received from the scene S. Accordingly, the apparatus 200 shall either continuously capture EM radiation data as per step 515 to record greyscale video images or capture an instantaneous moment of data as per step 516 to record a greyscale image.

The step 505 consequent to capturing video or still data is to analyse or display (e.g. at viewing screen 50) the data.

Regarding fabrication, the lens housing 12 may be provided with a standard mount such as the Nikon F Mount used for consumer SLR camera bodies and lenses.

Regarding fabrication, where a fluidic lens is used as the deformable lens 4, the lens may be any suitable fluidic lens such as the fluidic lens described in the applicants previous application WO 2011/138606.

Regarding fabrication, the dispersive lens 2 and/or diffractive lens 24 may be a blazed grating, especially a circular blazed grating. Alternatively, the lens 2 and/or diffractive lens 24 may be a kinoform, a bragg grating, or other such lensing device able to disperse the EM radiation according to frequency. Such lenses with surface relief elements are of particular use in at least so far as they can be formed so as to apply a predetermined degree of dispersion to wavebands of interest and therefore facilitate processing of such wavebands in the rest of the apparatus and at a particular spectral resolution. The skilled reader would in light of this present disclosure be in a position to calibrate the dispersive element 2 (or diffractive lens 24) to divide the EM radiation up into relevant component bands according to the context-specific spectral resolution. In general, the narrower the component bands to be separated/isolated, the more dispersive the lens would need to be. For many hyperspectral contexts, the component bands may have bandwidths in the region of 20 nm, 25-15 nm say; however in some contexts, such as laser illumination detection, narrower bands may be suitable (as they would tend to assist with clutter rejection), provided that capture time can be increased to mitigate against the signal-to-noise ratio issues at narrower bandwidths. For visible images, bandwidths of 50-100 nm may be adequate to give a reasonable match to the colour resolution of the human eye.

Regarding fabrication, the first switchable lensing device may be any suitable fluidic lens such as the fluidic lens described in the applicants previous application WO 2011/138606, though the back wall of the fluidic lens may need to be formed from a rigid material (though the objective wall should remain flexible).

The fluid chosen for the fluidic lenses should be low dispersion and therefore provide a low-dispersivity deformable lens. The effect being that when the selectively dispersive element 30 is in the collimating/non-dispersive condition, the residual dispersions of the optical system components (i.e. the first switchable lensing device 22, the grating 24, the LC cap 26 and the deformable lens 4) tend to cancel each other out. Thus an apochromatic system may be provided, bringing different EM component bands into focus at the same image plane.

Regarding fabrication, the second switchable lensing device 40 tends to be provided with tuned dispersions to as to enable operation in the first and second conditions. The diffractive-type grating lens 24 is formed in dependence upon the overall spectral resolution requirements of the system as will tend to be determined by the context of use. For example, in order to achieve a finer spectral resolution (for analysing narrower component bands), a greater dispersion should be effected by the element 24 by forming suitable blazing or other surface relief elements.

Regarding fabrication, the imaging sensor 6 may be provided by an array of light sensitive elements, as such a Charge-coupled Device (CCD) array or a complementary metal-oxide-semiconductor (CMOS) sensor array.

Moreover, the sensor 6 should tend to be a broadband sensor such that the sensor can record the intensity of the overall EM radiation. For example, where the sensor is formed from an array of pixels, each pixel can record EM radiation across the entire frequency range of the apparatus as a single intensity.

Regarding fabrication, the viewing screen or viewfinder 50 may be an array of light emitting elements, such as an array of LEDs or an OLED array.

Regarding fabrication, the discriminator 82 may be as described or equivalent to that described in the applicants previous application WO 2001/138606.

In further embodiments of the invention, the data processor 8 may be operable to analyse the de-focussed data (e.g. by stepping through a number of deformable lens 4 focal lengths but capturing sensor 6 data from a particular single waveband each time), perhaps in conjunction with the overall scene data, to estimate the range (i.e. stand-off distance) of content in the scene S.

The manual controls 60 described above in respect of the camera-implementation, may be operably connected to the deformable lens 4 (e.g. via the controller 10) to allow setting of deformable lens focal length.

Whilst above embodiments discuss slicing the EM radiation into red, green and blue visible light component bands, various other component bands may be defined. In particular, there may be provision in other embodiments for isolating at least one ultraviolet (UV) component band from the scene EM radiation and/or isolating at least one infra-red (IR) component band—and thereby allowing for hyperspectral analysis.

Moreover, whilst above embodiments have shown an apparatus and method for dividing a full spectrum into three component bands, other embodiments may provide for more than three component bands or less than three component bands to be split out of the EM radiation. Still further, in embodiments, component bands may be contiguous, non-contiguous or overlapping.

Whilst above embodiments discuss a method involving stepping through component bands in order of frequency, variant embodiments may step through the component bands in another order. However, the process of steeping through in sequence minimises step-to-step dimension changes to deformable lens 4 and so may assist with speeding up the recording process.

Cycle time may vary between embodiments, being partly context dependent (narrower component bands would need more sensor capture time to achieve adequate signal-to-noise ratio), and being dependent on the surrounding apparatus (e.g. the type and exact design of the fluidic lens).

Whilst the above embodiments have concentrated on a two-lens system for simplicity (which has allowed modelling of the apparatus), the skilled man would appreciate that in general the more lens surfaces provided, the greater the ability offered to modify those surfaces to correct for aberrations (this includes geometric aberrations such as coma and astigmatism as well as chromatic (colour). As such, the skilled man would appreciate that further embodiments may include conventional glass elements and/or further switchable lens devices (some of which may be dispersive, some may not); they would all add to the mix and increase flexibility to adjust surface shapes and balance aberrations.

The invention claimed is:

1. A spectral imaging apparatus for processing electromagnetic (EM) radiation, the EM radiation originating from a target scene and comprising a wide range of frequencies, the apparatus comprising:
    a dispersive element for receiving EM radiation from the target scene and promoting differing amounts of dispersion depending on the frequency of the EM radiation, the dispersive element including:
    a First Switchable lensing device (FSLD) which in a first state allows EM radiation to pass substantially unaffected and which in a second state collimates the received EM radiation, wherein the FSLD is arranged to receive light from the target scene; and
    a Second Switchable Lensing Device (SSLD) which in a first state disperses received EM radiation and in a second state allows EM radiation to pass unmanipulated, the SSLD being arranged to receive light from the FSLD, and including:
    a diffractive lens having a first refractive index and comprising surface relief elements; and
    a liquid crystal element, complimentary to the diffractive lens and operable in the first state of the SSLD to have a refractive index different to the first refractive index and in the second state of the SSLD to have a refractive index substantially matching the first refractive index;
    wherein the FSLD and the SSLD may both be placed in their first states to effect the dispersive condition of the dispersive element, or may both be placed in their second states to effect the non-dispersive condition of the dispersive element;
    a deformable lens arranged to receive EM radiation from the dispersive element; and
    an imaging sensor for detecting EM radiation across the wide range of frequencies, and arranged to receive EM radiation from the deformable lens;
    wherein the deformable lens is operable to adopt any one of a plurality of focal conditions, each focal condition tending to focus a different range of the EM radiation at the imaging sensor, each focal condition thereby defining a component band for the EM radiation.

2. A spectral imaging apparatus according to claim 1 wherein the dispersive element is a selectively dispersive element, having a dispersive condition and a non-dispersive condition and being operable to switch from one condition to the other.

3. A spectral imaging apparatus according to claim 1 wherein the diffractive lens is a blazed circular grating.

4. A spectral imaging apparatus according to claim 1 wherein the diffractive lens is a bragg programmable grating or a kinoform.

5. A spectral imaging apparatus according to claim 1, further comprising a user-operated switch for changing the dispersive element between the dispersive condition and the non-dispersive condition.

6. A spectral imaging apparatus according to claim 1 wherein the dispersive element comprises a diffractive grating.

7. A spectral imaging apparatus according to claim 1 wherein the deformable lens is a fluidic lens.

8. A spectral imaging apparatus according to claim 1 wherein the plurality of focal conditions define at least a component band in the infra-red range.

9. A spectral imaging apparatus according to claim 1 wherein the plurality of focal conditions define at least a component band in the ultra-violet range and/or at least a component band in a visible range.

10. A spectral imaging apparatus according to claim 1 wherein the apparatus further comprises a viewing screen for providing an operator with an image representing a target scene.

11. A spectral imaging apparatus according to claim 1 wherein the apparatus comprises a viewing screen for providing an operator with an image representing a target scene, wherein the viewing screen is operable to superimpose hyperspectral data onto the image.

12. A spectral imaging apparatus according to claim 1 wherein the apparatus further comprises:
a data processing unit interfaced with the imaging sensor;
an actuator for the deformable lens; and
a controller interfaced with the imaging sensor and the actuator;
whereby the controller may act in concert with the data processing unit to interrogate the EM radiation.

13. A spectral imaging apparatus according to claim 1 comprising a user-operated switch for changing the focal condition of the deformable lens.

14. An Unmanned Vehicle comprising an apparatus according to claim 1.

15. A camera comprising an apparatus according to claim 1.

16. An imaging system comprising an apparatus according to claim 1.

17. A spectral imaging apparatus, comprising:
a dispersive element for receiving EM radiation from a target scene and promoting differing amounts of dispersion depending on the frequency of the EM radiation, the dispersive element including:
a First Switchable lensing device (FSLD) which in a first state allows EM radiation to pass substantially unaffected and which in a second state collimates the received EM radiation, wherein the FSLD is arranged to receive light from the target scene; and
a Second Switchable Lensing Device (SSLD) which in a first state disperses received EM radiation and in a second state allows EM radiation to pass unmanipulated, the SSLD being arranged to receive light from the FSLD, the SSLD including:
a diffractive lens having a first refractive index and comprising surface relief elements; and
a liquid crystal element, complimentary to the diffractive lens and operable in the first state of the SSLD to have a refractive index different to the first refractive index and in the second state of the SSLD to have a refractive index substantially matching the first refractive index;
wherein the FSLD and the SSLD may both be placed in their first states to effect the dispersive condition of the dispersive element, or may both be placed in their second states to effect the non-dispersive condition of the dispersive element;
a deformable lens arranged to receive EM radiation from the dispersive element;
an imaging sensor for detecting EM radiation across a range of frequencies, and arranged to receive EM radiation from the deformable lens;
a data processing unit interfaced with the imaging sensor;
an actuator for the deformable lens; and
a controller interfaced with the imaging sensor and the actuator, whereby the controller may act in concert with the data processing unit to interrogate the EM radiation;
wherein the deformable lens is operable to adopt any one of a plurality of focal conditions, each focal condition tending to focus a different range of the EM radiation at the imaging sensor, each focal condition thereby defining a component band for the EM radiation; and
wherein the plurality of focal conditions define a component band in at least one of the infra-red range, the ultra-violet range, and the visible range.

18. A spectral imaging apparatus according to claim 17 wherein the dispersive element is a selectively dispersive element, having a dispersive condition and a non-dispersive condition and being operable to switch from one condition to the other.

* * * * *